N. L. LERILLE.
ATTACHMENT FOR SEINES.
APPLICATION FILED APR. 25, 1908.
902,419.
Patented Oct. 27, 1908.
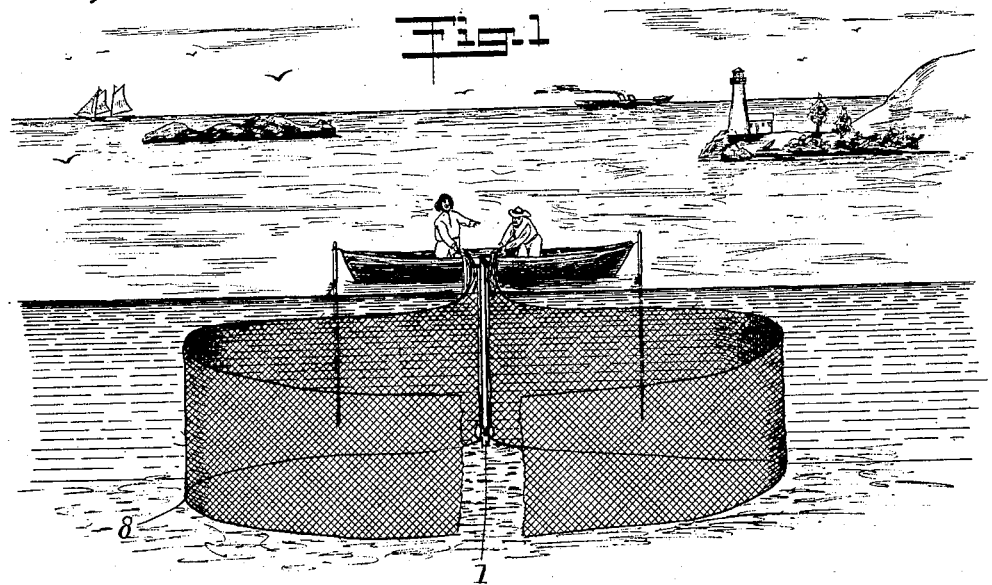
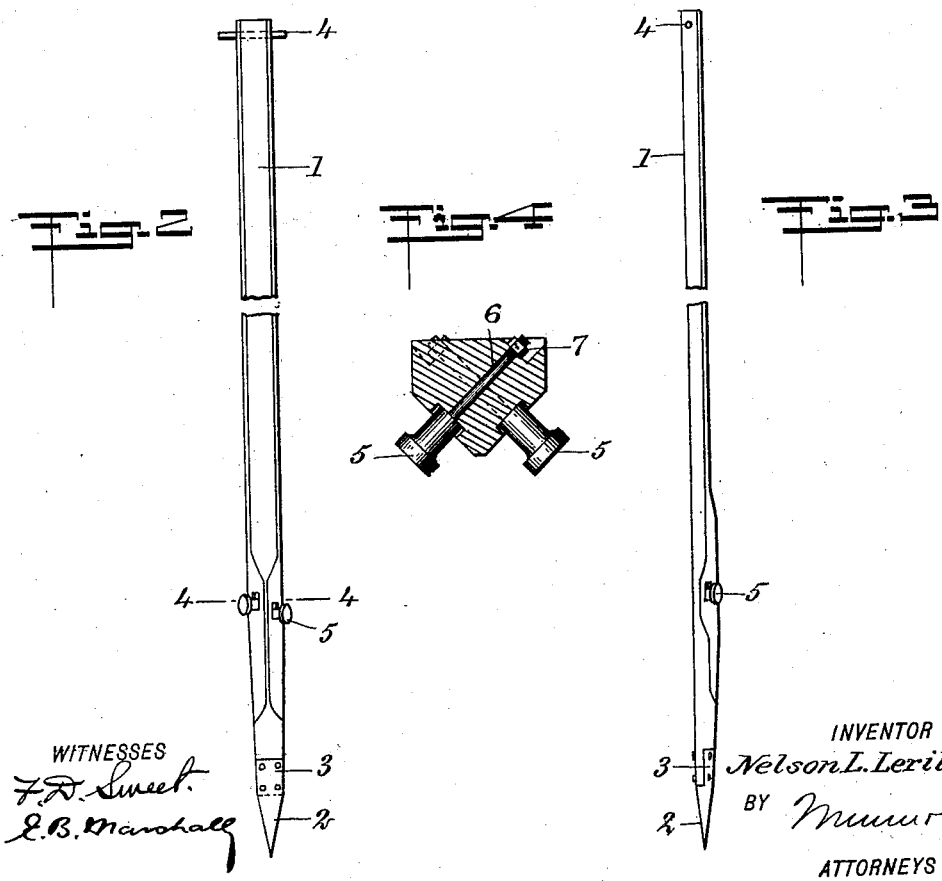
WITNESSES
INVENTOR
Nelson L. Lerille
BY
ATTORNEYS
THE NORRIS PETERS CO., WASHINGTON, D. C.

UNITED STATES PATENT OFFICE.

NELSON L. LERILLE, OF LOCKPORT, LOUISIANA.

ATTACHMENT FOR SEINES.

No. 902,419.        Specification of Letters Patent.        Patented Oct. 27, 1908.

Application filed April 25, 1908. Serial No. 429,184.

*To all whom it may concern:*

Be it known that I, NELSON L. LERILLE, a citizen of the United States, and a resident of Lockport, in the parish of Lafourche and State of Louisiana, have invented a new and Improved Attachment for Seines, of which the following is a full, clear, and exact description.

My invention relates to seines and has for its object to provide a stake which is to be used to secure the ends of a seine in place and hold it in position while the seine is being hauled.

Another object is to provide means to hold the lead-line of the seine down close to the mud at any given point, without damage to the seine, and which will also enable the seine to be hauled past the said means.

Still another object of the invention is to provide means by which the fishing boat may be held close to the stake and which also serves to assist in preventing the stake from coming out of the mud.

Still another object of the invention is to provide a stake with a plurality of points of different lengths which may be applied as may be necessary for use on different bottoms where the depth of the mud varies.

Still other objects of the invention will appear in the following more complete description.

In this specification I will describe the preferred embodiment of the invention, but I do not limit myself thereto as I consider myself entitled to all forms and embodiments of the invention which may be held to fall within the scope of the appended claims.

In the drawings similar reference characters indicate similar parts in all the figures, in which Figure 1 is a view showing my invention in use with the seine attached thereto; Fig. 2 is an elevation of my invention showing the spools, the point and the means by which the boat may be secured; Fig. 3 is a side elevation of the same, and Fig. 4 is an enlarged sectional view on line 4—4 of Fig. 2.

Hitherto in hauling seines, it has not been necessary for fishermen to haul them from some point in deep water, because the fish were plentiful and it was possible for fishermen to haul their seines near the shore where they could get out of their skiffs and hold the lead-line of the seine to the bottom with their feet, but now, because of the scarcity of the fish it is necessary for the fishermen to haul their seines in deep water where the old method, by which the fishermen held the seine down with their feet, can no longer be used. Fishermen have, therefore, had great difficulty in hauling their seines in deep water, because of the impossibility of keeping the lead-line of the seine close to the bottom and in consequence many of the fish have escaped under the lead-line of the seine. By the use of the invention herein shown, the lead-line of the seine may be held close to the bottom and the fishermen may haul their seines from their boats, without danger of losing the fish which are encircled by the seine.

A stake 1 of varying length is provided, at the bottom of which there are means for securing a point 2, which may vary in length depending on the character of the bottom in which the stake is to be driven. The point 2 may be fastened to the bottom of the stake by screws 3, or by any other suitable means. At the top there is a cross pin 4 and at a distance from the bottom of the stake there are spools 5 which are mounted on spindles 6, having nuts 7 at their outer ends to prevent the spools from slipping off. Preferably two spools 5 are provided, mounted on the spindles 6, which are at right angles to each other, the spindles passing through the stake 1 and having their rear terminals threaded and to which the nuts 7 may be secured to hold the spindles in place.

In using my invention a suitable point 2 is fastened by the means 3 to the bottom of the stake 1, and one end of the seine is towed in the usual way until the seine encircles therein water in which the fish are swimming. The lead-line 8 at both terminals of the seine is then caught under the spools 5 and the stake 1 is then driven into the mud. Two or more of the stakes may be used when desired, and by this means the lead-line of the seine will be in the proper position when the seine is hauled and there will be no danger of the fish escaping. The painter of the fishing boat is then secured to the cross pin 4 to hold the boat in place and also to hold the stake in the mud. The seine may then be hauled.

Having thus described my invention, I claim as new and desire to secure by Letters Patent:

1. An attachment for seines consisting of a stake which is adapted to be driven into submerged ground, and means at the lower end of the stake to hold the lead line of a seine close to the bottom, the said means being adapted to permit the seine being hauled.

2. An attachment for seines consisting of a stake which is adapted to be driven into submerged ground, means at the lower end of the stake which are adapted to hold the lead line of the seine close to the bottom and which will permit the seine being hauled past the said means, and means at the upper end of the stake to permit of the attachment thereto of an anchoring device.

3. An attachment for seines consisting of a stake, a spindle secured thereto, and a spool mounted on the spindle.

4. An attachment for seines consisting of a stake, a spindle secured to the stake at its lower end, means at its upper end to fasten an anchoring device thereto, and a spool mounted on the spindle.

5. An attachment for seines consisting of a stake, two spindles secured to the stake, the spindles being disposed at an angle to each other, and spools mounted on the spindles respectively.

6. An attachment for seines consisting of a stake, a plurality of spindles secured to the stake, the said spindles being disposed at an angle to each other, spools mounted on the spindles respectively, and means at the upper end of the stake to fasten an anchoring device thereto.

In testimony whereof I have signed my name to this specification in the presence of two subscribing witnesses.

NELSON L. LERILLE.

Witnesses:
ARTHUR J. LERILLE,
THOMAS H. MATHEWS.